July 12, 1932.     J. J. FORNEY     1,867,216
LIQUID LEVEL GAUGE
Filed March 12, 1929
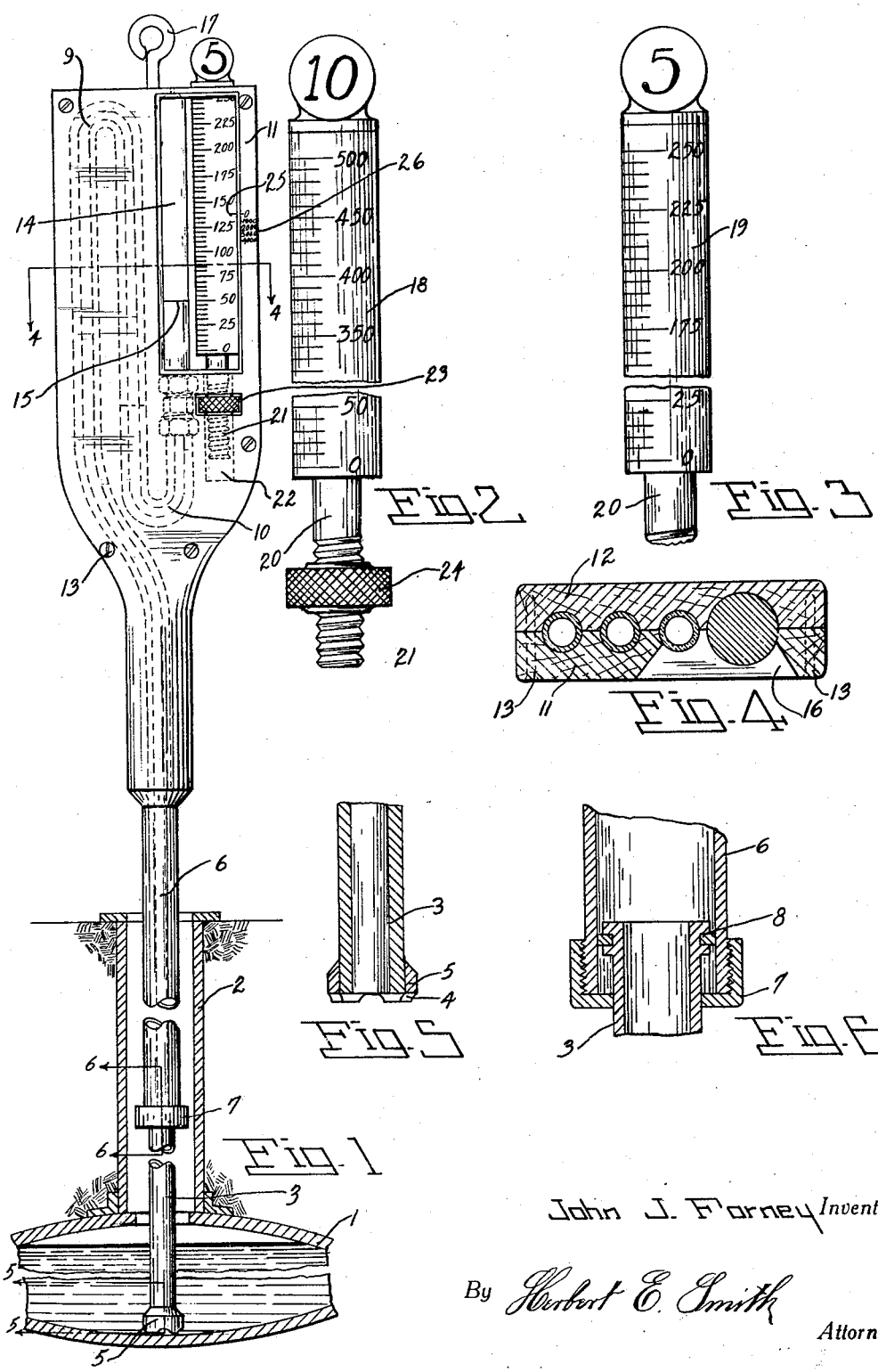
John J. Forney, Inventor
By Herbert E. Smith, Attorney Patented July 12, 1932

1,867,216

UNITED STATES PATENT OFFICE

JOHN J. FORNEY, OF SPRINGDALE, WASHINGTON

LIQUID LEVEL GAUGE

Application filed March 12, 1929. Serial No. 346,356.

My present invention relates to improvements in a liquid level gauge of the ullage rod or pole type, in which atmospheric pressure is utilized in combination with a registering or indicating liquid and a liquid gauge or scale. While the gauge of my invention is well adapted for various uses it is particularly applied to measuring the quantity of gasoline contained in underground tanks at filling stations for automotive vehicles, in order that the number of contained gallons (or other units) may be ascertained with accuracy and reliability.

In carrying out my invention I utilize an extensible, telescopic tubular rod, or pole, and a tubular tortuous head in which is contained a sealed registering liquid, as colored alcohol, for co-operation with a gauge. The registering liquid is displaced, under atmospheric pressure, by a column of air when the lower open end of the tubular rod is submerged in the liquid to be measured, and the level of the registering liquid co-operates with the stationary gauge for indicating the measured contents, of the tank.

Interchangeable scales are adapted for use with the meter, and means are provided for adjusting the scale and gauge to different atmospheric altitudes, above sea level.

The invention consists in certain novel combinations and arrangements of parts as above set forth as will hereinafter be more clearly specified and claimed. In the accompanying drawing I have illustrated one complete example of the physical embodiment of my invention wherein the parts are combined and arranged according to the best mode I have thus far devised for the practical application of the principles of my invention.

Figure 1 is a view in elevation of the gauge, with parts in dotted lines, showing a portion of the gasoline tank in section, with the gauge in operative position.

Figure 2 is an enlarged view of one of the interchangeable scales with a capacity of ten barrels, and Figure 3 is a view of a similar scale with a capacity of five barrels, the gallon measures also being indicated on the scales.

Figure 4 is an enlarged transverse sectional view at line 4—4 of Figure 1. Figure 5 is an enlarged detail sectional view at line 5—5 of Figure 1 and Figure 6 is an enlarged sectional detail view of a telescoping joint at line 6—6 of Figure 1.

In Figure 1 a portion of a gasoline tank is indicated in section as 1, and located underground as is usual, the filling pipe for the tank being indicated as 2.

The measuring pole or rod of the gauge is of tubular, telescoping construction, in order that the rod may be used in tanks of varying depth, and with tanks that are located at varying depths from the surface of the ground, and of course the lower end of the tubular rod is submerged in the contents of the tank, and when the gauge is to be used, the lower end of the tubular rod rests upon the bottom of the tank.

The tubular rod may be made up of a number of sections, here shown as two and designated as 3 and 6. The lower section 3 is provided with an intake head 5 and lateral ports 4 through which the gasoline flows into the tubular rod, and a leak-proof, sliding joint is provided between the sections by the use of a screw cap 7 on the lower end of the upper section, through which cap the upper end of the lower section passes. A friction washer or gasket 8 is employed on the upper end of the lower section and within the upper section to insure the leak proof joint and to maintain the telescoping sections in frictional contact to prevent undue relative movement of the sections.

At its upper end the tubular rod is fashioned with a tortuous head that includes an inverted U-shape bend 9 and a U-shape bend 10, and these parts are encased in a sectional holder comprising side pieces 11 and 12 that are secured together by means of screws 13. The holder may be of wood, or other material, and conforms to the shape of the tortuous head of the tubular rod, and it is recessed at 16, and provided with a suspending hook 17, the latter to be used when the gauge is out of use.

The gooseneck or U-shaped bend 10 of the tortuous head terminates in a glass tube 14 which performs the functions of a vent tube into which is adapted to rise a registering liquid 15, of colored alcohol or similar liquid, and the level of this registering liquid may be observed in the glass tube through an opening 16 in one face of the holder.

It will be apparent that as the tubular rod is submerged in the gasoline in the tank a quantity of air will have been trapped in the tubular rod between the gasoline and the registering liquid or alcohol. As the tubular rod is lowered, atmospheric pressure on the gasoline in the tank forces a column of gasoline up through the rod with a column of air above the column of gasoline. The bends 9 and 10 provide a seal against entrance of gasoline to the registering liquid and they also prevent displacement of the alcohol from the goose neck or U-bend 10.

Under pressure through the column of gasoline and the column of air, the level of the registering liquid is raised in the glass tube 14, and this indicated level co-operates with a scale 18 or 19, to indicate the number of gallons in the tank.

The scale 18 in Figure 2 has a capacity of 500 gallons and is adapted for use in a 10-barrel tank, while the scale 19 has a measuring capacity of 250 gallons and is adapted for use in a 5-barrel tank.

In Figure 1 the registering liquid has risen to the 50 gallon mark indicating that there are fifty gallons of gasoline in the tank 1. Of course, when the tubular rod has been removed from the tank the column of gasoline drains therefrom to the tank, the column of air expands, to normal atmospheric pressure, and the registering liquid finds its level in the goose-neck or U-bend 10, it being understood that the top or upper end of the glass tube 14 is properly vented to permit the displacement of the registering liquid.

The interchangeable scales are provided with bolts 20 having threaded ends 21 and the scales are nested in the recess or opening 16 with the bolts located in holes 22 indicated by dotted lines in Figure 1 as sunk below the lower wall of the recess. An open slot 23 intercepts the hole 22 to accommodate the non-traveling nut 24 through which the bolt is threaded, and it will be apparent that by turning the nut the gauge may be raised or lowered with relation to the glass tube 14.

On the holder adjacent the scale a sea-level mark 0 is indicated and a complementary sea-level mark 25 is displayed on the scale. These marks are brought to register, as in Figure 1 when the scale and meter are used at sea-level. At 26, the holder is provided with an altitude scale or pressure scale to indicate atmospheric pressures above sea level, and the mark 25 is brought to register with a selected altitude or atmospheric pressure reading to conform to the altitude above sea-level in which the meter is being used.

Having thus fully described my invention, what I claim as new and desire to secure by Letters Patent is:—

The combination in a liquid level gauge, of a recessed holder having a slot, a sectional, telescoping, tubular rod adapted to be lowered into a tank and having intake ports at its lower end, a transparent vent tube mounted in the recessed holder, means including a pair of oppositely arranged bends forming a trapped connection between the rod and tube for maintaining a registering liquid, an adjustable scale located adjacent to and parallel with the vent tube, a bolt on the scale, and a non-traveling nut on the bolt supported in the slot of the holder for adjusting the scale relatively to the vent tube.

In testimony whereof I affix my signature.

JOHN J. FORNEY.